(12) United States Patent
Natarajan et al.

(10) Patent No.: US 12,318,842 B2
(45) Date of Patent: Jun. 3, 2025

(54) THERMOPLASTIC BINDERS FOR USE IN BINDER JETTING ADDITIVE MANUFACTURING

(71) Applicant: General Electric Company, Schenectady, NY (US)

(72) Inventors: Arunkumar Natarajan, Niskayuna, NY (US); Carlos Bonilla Gonzalez, Schenectady, NY (US); Kwok Pong Chan, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/838,936

(22) Filed: Jun. 13, 2022

(65) Prior Publication Data

US 2022/0305556 A1    Sep. 29, 2022

Related U.S. Application Data

(63) Continuation of application No. 15/680,733, filed on Aug. 18, 2017, now abandoned.

(51) Int. Cl.
*B22F 3/10* (2006.01)
*B22F 1/107* (2022.01)
(Continued)

(52) U.S. Cl.
CPC ............ *B22F 3/1021* (2013.01); *B22F 1/107* (2022.01); *B22F 10/14* (2021.01); *B22F 10/38* (2021.01);
(Continued)

(58) Field of Classification Search
CPC ........ B22F 10/10; B22F 1/107; B22F 3/1021; B22F 10/14; B22F 10/38; B22F 10/25;
(Continued)

(56) References Cited

U.S. PATENT DOCUMENTS 2,765,507 A    10/1956    Wolf et al.
4,848,353 A    7/1989    Engel
(Continued)

FOREIGN PATENT DOCUMENTS

CN    102764939 A    11/2012
CN    105562696 A    5/2016
(Continued)

OTHER PUBLICATIONS

Gohil et al.; "Studies on the Cross-linking of Poly(Vinyl Alcohol)", Journal of Polymer Research vol. 13, 2006, pp. 161-169). (Year: 2006).*

(Continued)

*Primary Examiner* — Adil A. Siddiqui
(74) *Attorney, Agent, or Firm* — Dinsmore & Shohl LLP

(57) ABSTRACT

A binder solution configured for use in binder jet printing is provided. The binder solution may include a primer, a surfactant, and a linkable thermoplastic binder comprising a first polymer strand and a second polymer strand, wherein the first polymer strand comprises a first functional group and the second polymer strand comprises a second functional group, and wherein the first and second functional groups are configured to non-covalently couple at least a portion of the second polymer strand with at least a portion of the first polymer strand; wherein the first polymer strand and the second polymer strand are both polymer strands of the same thermoplastic polymer, and wherein the first polymer strand further comprises the second functional group and the second polymer strand further comprises the first functional group.

16 Claims, 4 Drawing Sheets

(51) Int. Cl.
  *B22F 10/14* (2021.01)
  *B22F 10/38* (2021.01)
  *B33Y 10/00* (2015.01)
  *B33Y 70/00* (2020.01)
  *B33Y 80/00* (2015.01)
  *C08K 3/08* (2006.01)
  *C08K 5/00* (2006.01)

(52) U.S. Cl.
  CPC .............. *B33Y 10/00* (2014.12); *B33Y 70/00* (2014.12); *B33Y 80/00* (2014.12); *C08K 3/08* (2013.01); *C08K 5/00* (2013.01); *C08K 2201/005* (2013.01)

(58) Field of Classification Search
  CPC .......... B22F 10/28; B22F 10/64; B22F 10/00; B33Y 10/00; B33Y 70/00; B33Y 80/00; B33Y 40/20; B33Y 30/00; C08K 3/08; C08K 5/00; C08K 2201/005; B28B 1/001; B29C 64/209; B29C 64/165
  See application file for complete search history.

(56) References Cited

U.S. PATENT DOCUMENTS

| | | |
|---|---|---|
| 5,215,946 A | 6/1993 | Minh |
| 5,436,058 A | 7/1995 | Kato et al. |
| 5,749,041 A | 5/1998 | Lakshminarayan et al. |
| 5,976,457 A | 11/1999 | Amaya et al. |
| 6,075,083 A | 6/2000 | Peiris |
| 6,372,033 B1 | 4/2002 | Chalasani et al. |
| 6,508,980 B1 | 1/2003 | Sachs et al. |
| 6,949,284 B2 | 9/2005 | Yoshihara et al. |
| 6,966,960 B2 | 11/2005 | Boyd et al. |
| 7,795,349 B2 | 9/2010 | Bredt et al. |
| 8,530,578 B2 | 9/2013 | Bharti et al. |
| 8,568,649 B1* | 10/2013 | Balistreri ............... B33Y 80/00 264/642 |
| 8,992,720 B2 | 3/2015 | Bharti et al. |
| 9,624,405 B2 | 4/2017 | Il et al. |
| 10,688,558 B2 | 6/2020 | Barua et al. |
| 10,828,827 B2 | 11/2020 | Kusahara et al. |
| 2002/0025435 A1 | 2/2002 | Hanssen et al. |
| 2005/0075247 A1* | 4/2005 | Kakino ................. G03F 7/0388 503/201 |
| 2005/0170285 A1 | 8/2005 | Sugasaki et al. |
| 2006/0154070 A1 | 7/2006 | Wakiya et al. |
| 2006/0208388 A1* | 9/2006 | Bredt ..................... B33Y 70/00 156/305 |
| 2010/0022710 A1 | 1/2010 | Xie et al. |
| 2015/0069649 A1* | 3/2015 | Bai ........................ C04B 35/581 264/129 |
| 2015/0291833 A1 | 10/2015 | Kunc et al. |
| 2016/0001506 A1 | 1/2016 | Hirata et al. |
| 2016/0318250 A1 | 11/2016 | Moussa |
| 2018/0071820 A1 | 3/2018 | Natarajan et al. |
| 2018/0236731 A1 | 8/2018 | Natarajan et al. |
| 2018/0326484 A1 | 11/2018 | Bonilla Gonzalez et al. |

FOREIGN PATENT DOCUMENTS

| | | |
|---|---|---|
| JP | 2003027003 A | 1/2003 |
| JP | 2005159108 A | 6/2005 |
| JP | 5965790 B2 | 8/2016 |
| KR | 20170092172 A | 8/2017 |
| WO | WO2014/028679 A1 | 2/2014 |
| WO | WO2014094539 A1 | 6/2014 |
| WO | WO2016/108154 A1 | 7/2016 |
| WO | WO2017/018984 A1 | 2/2017 |
| WO | WO2017/029657 A1 | 2/2017 |
| WO | WO2017/046132 A1 | 3/2017 |
| WO | WO2017/127221 A1 | 7/2017 |

OTHER PUBLICATIONS

McNeill et al. ("Thermal Stability and Degradation Mechanisms of Poly(Acrylic Acid) and its Salts: Part 1—Poly(Acrylic Acid)"; Polymer Degradation and Stability, vol. 29, 1990; pp. 233-246). (Year: 1990).*

Boere et al., Biofabrication of Reinforced 3D Scaffolds Using Two Component Hydrogels, Journal of Material Chemistry, Issue 46, Oct. 9, 2015.

Derby et al., Manufacture of Biomaterials by a Novel Printing Process, Journal of Materials Science Materials in Medicine, vol. 13, Issue 12, Dec. 2002, pp. 1163-1166.

Von Fraunhofer, Adhesion and Cohesion, International Journal of Dentistry, Feb. 21, 2012, 16 Pages.

* cited by examiner

THERMOPLASTIC BINDERS FOR USE IN BINDER JETTING ADDITIVE MANUFACTURING

PRIORITY INFORMATION

The present application claims priority to, and is a divisional application of, U.S. patent application Ser. No. 15/680,733 filed on Aug. 18, 2017, which is incorporated by reference herein in its entirety for all purposes.

TECHNICAL FIELD

The subject matter disclosed herein relates to additive manufacturing, and more particularly, to thermoplastic binders for use in binder jetting additive manufacturing techniques.

Additive manufacturing, also known as 3D printing, generally involves printing an article one layer at a time using specialized systems. In particular, a layer of a material (e.g., a metal powder bed) may be deposited on a working surface and bonded with another layer of the same or a different material. Additive manufacturing may be used to manufacture articles (e.g., fuel nozzles, fuel injectors, turbine blades, etc.) from computer aided design (CAD) models using techniques such as, but not limited to, metal laser melting, laser sintering, and binder jetting. These additive manufacturing techniques melt, sinter, or chemically bind layers of material to generate the desired article. Additive manufacturing may facilitate manufacturing of complex articles and enable flexibility for customization of articles compared to techniques such as molding (e.g., cast molding, injection molding). Additionally, additive manufacturing can reduce the overall manufacturing costs associated with generating these complex articles compared to molding techniques generally used.

BRIEF DESCRIPTION

In one embodiment, a method of binder jet printing a part includes depositing a layer of a powder on a working surface of a binder jet printer and selectively printing a binder solution having a linkable thermoplastic binder into the layer of the powder in a pattern to generate a printed layer. The pattern is representative of a structure of a layer of the part. The linkable thermoplastic binder includes a first polymer strand and a second polymer strand, the first polymer strand includes a first functional group and the second polymer strand includes a second functional group, and the first and second functional groups non-covalently couple the first polymer strand with the second polymer strand. The method of binder jet printing the part also includes curing the linkable thermoplastic binder in the printed layer to generate a layer of a green body part, heating the green body part above a first temperature to remove at least a portion of the linkable thermoplastic binder and generate a brown body part, and heating the brown body part above a second temperature to sinter the powder to generate the part. The part is substantially free of char residue.

In a second embodiment, a part manufactured via a binder jet printing process includes the steps of depositing a layer of a powder on a working surface of a binder jet printer and selectively printing a binder solution having a linkable thermoplastic binder into the layer of powder in a pattern to generate a printed layer. The pattern is representative of a structure of a layer of the part. The linkable thermoplastic binder includes a first polymer strand and a second polymer strand, the first polymer strand includes a first functional group and the second polymer strand includes a second functional group, and the first and second functional groups non-covalently couple the first polymer strand with the second polymer strand. The binder jet printing process also includes curing the linkable thermoplastic binder in the printed layer to generate a layer of a green body part, heating the green body part above a first temperature to remove at least a portion of the linkable thermoplastic binder and generate a brown body part, and heating the brown body part above a second temperature to sinter the powder to generate the part. The part is substantially free of char residue.

In a third embodiment, a binder solution that may be used in binder jet printing, including a binder solution having a linkable thermoplastic binder including a first polymer strand and a second polymer strand. The first polymer strand includes a first functional group and the second polymer strand includes a second functional group, and the first and second functional groups non-covalently couple at least a portion of the second polymer strand with at least a portion of the first polymer strand, and the binder solution is substantially free of a surfactant.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
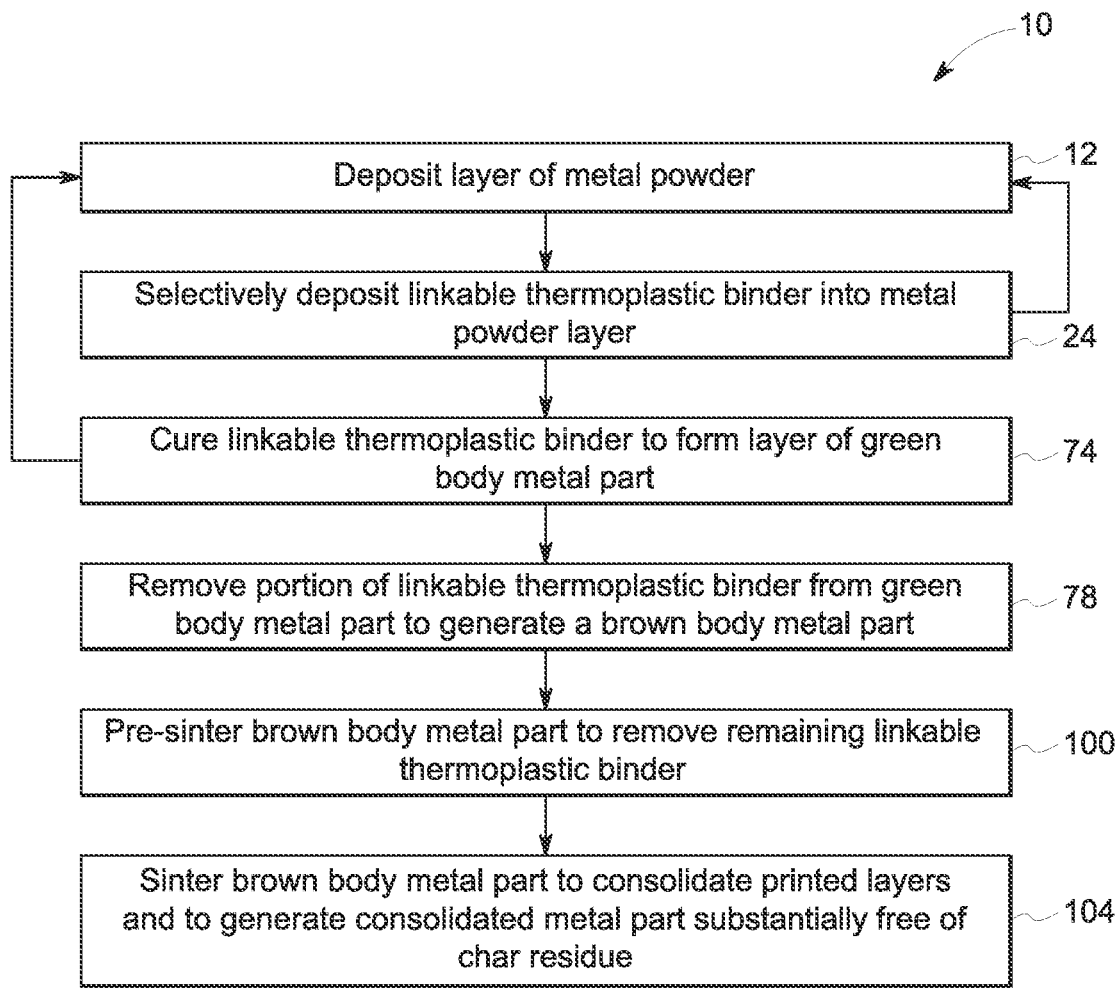
FIG. 1 is a flow diagram of an embodiment of a method of manufacturing a metal part via a binder jet printing process that uses a linkable thermoplastic binder.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As used herein, a "linkable thermoplastic binder" is intended to denote a chemical binder that includes a first and a second thermoplastic polymer having functional groups that interact with one another via weak non-covalent forces (e.g., interactions, bonds) to link, or otherwise couple, strands of each respective thermoplastic polymer. As used herein, "weak non-covalent forces" are intended to denote hydrogen bonding, ionic bonding, Van der Waals forces, and the like. As defined herein, "green body metal part" and "green body part" is intended to denote a printed part that has not undergone heat treatment to remove the chemical binder. As defined herein, "brown body metal part" and "brown body part" is intended to denote a printed part that has undergone heat treatment to remove the chemical binder. As defined herein, a metal part is intended to denote a part having metallic materials. While the present embodiments are primarily described in the context of metal parts, the linkable thermoplastic binders described herein may be applicable to a number of other 3D printed parts, including ceramic parts.

There are several techniques for manufacturing articles, such as ceramic parts and/or metal parts used in a variety of machinery. For example, molding techniques such as sand molding, cast molding, and/or injection molding, among others, may be used to manufacture parts for machinery applications. As noted above, other techniques that may be used to manufacture parts include additive manufacturing. For example, additive manufacturing techniques include, but are not limited to, laser melting, laser sintering, and binder jetting. Additive manufacturing may be advantageous for fabricating parts compared to molding techniques due, in part, to the flexibility of materials that may be used, the ability to manufacture more complex articles, and lower manufacturing costs.

Unlike laser melting and laser sintering additive manufacturing techniques, which heat the material to consolidate and build layers of the material to form a part, binder jetting uses a chemical binder to bond particles of the material into layers that form a green body the part. The green body part may be further processed (e.g., sintered) to consolidate the layers and form the final metal part. Chemical binders have been used in sand molding techniques to bond sand particles and form a sand mold that can be used to fabricate other parts. Similar to sand molding, in binder jet printing, the chemical binder is successively deposited into layers of powder (e.g., ceramic and/or metal powder) to print the part. For example, the chemical binder (e.g., a polymeric adhesive) may be selectively deposited onto a powder bed in a pattern representative of a layer of the part being printed. Each printed layer may be cured (e.g., via heat, light, moisture, solvent evaporation, etc.) after printing to bond the particles of each layer together to form the green body part. After the green body part is fully formed, the chemical binder is removed during post-printing processes (e.g., debinding and sintering). It may be appreciated that such debinding and sintering steps are not part of sand molding processes, in which the chemical binder remains an integral part of the sand mold, even as the sand mold is subsequently used to form a molded metal part. However, in binder jet 3D printing of direct metal and/or ceramic components, the chemical binder is an integral part of the green body part (e.g., the chemical binder is disposed within and in between each layer of the printed part), and is subsequently removed during debinding and/or sintering to form a completed 3D printed metal part. It may also be noted that binder jet printing enables the manufacture of metal and/or ceramic parts having complex, 3D geometries that are impossible or impractical to manufacture using a sand molding manufacturing process.

As discussed above, the green body part undergoes additional processing (e.g., debinding and sintering) to consolidate the layers and form the completed 3D printed metal part. Accordingly, it is desirable for the green body part to have a suitable green strength for handling (e.g., transferring, inspecting, depowdering) during the post printing processes. However, chemical binders previously available for binder jet 3D printing tend to produce char residue within the consolidated metal part. For example, a process for removing the chemical binders from a brown body part may be performed in an oxygen ($O_2$) containing environment. The $O_2$ may drive complete decomposition of the chemical binder to carbon dioxide ($CO_2$) and water ($H_2O$), among other decomposition by-products. However, these debinding conditions (e.g., $O_2$-containing environment) may also result in formation of metal oxides in the consolidated metal part. Accordingly, certain properties (e.g., mechanical properties) of the consolidated metal part may be undesirable and the part may be unsuitable for use in the desired machinery.

For example, in Nickel alloys, during debinding (e.g., at temperatures between approximately 400° Celsius (° C.) and approximately 450° C.) the chemical binder from the green part is burned out leaving a brown part that is mostly a metal powder bound by trace amounts of the chemical binder. Next the part is subjected to different phases of sintering during which time the metal powder particles starts to neck during sintering at temperatures in excess of 1000 degrees Celsius (° C.), depending on the metal powder used to fabricate the printed metal part. Additionally, diffusion takes over during long incubation times of sintering, which is typically between approximately 1280° C. and approximately 1300° C. for between approximately 6 hours and approximately 24 hours to close out most of the porosity in the metal part and produce parts between approximately 94% and approximately 99% density. At these debinding and sintering temperatures, when oxygen is present, oxidation of the metal particles may occur in the metal part, resulting in metal oxide formation on surfaces and in between layers of the metal part. Both char residue and oxidation of the metal particles can affect certain properties of the metal part (e.g., microstructure, mechanical properties) that may result in undesirable effects (e.g., stress fractures, corrosion, etc.) when the metal part is in use. As such, it is presently recognized that there is a need to develop chemical binders that can be used for binder jet 3D printing that provide sufficient bond strength to maintain the integrity of the green body metal part, after printing and before debinding, and that are cleanly removed during debinding and/or sintering such that the consolidated metal part is substantially free of char and any other undesirable decomposition products of the chemical binder.

Chemical binders, such as thermoset binders, generally provide a green strength that is suitable for handling of the green body metal part during post printing processes. In thermoset binders, polymer strands are highly crosslinked (i.e., via covalent interactions and bonds) and result in a desirable green strength for handling the green body metal part. However, it is presently recognized thermoset binders are difficult to remove in inert and vacuum conditions due to strong covalent bonding between the crosslinked polymer strands. As such, thermoset binders are generally removed in the presence of air (oxygen), which may result in an undesirable amount of byproducts (e.g., char, metal oxides) that affect the overall properties of the completed 3D printed metal part. For example, in the presence of air, the thermoset binder may decompose in a manner that increases the oxide content within (e.g., between the particles of the metal powder) the metal part during removal. These oxides may induce metal oxide formation during sintering of the printed metal part. The metal oxide on the consolidated metal part generated after sintering the printed metal part may affect mechanical properties of the consolidated metal part resulting in mechanical property debits. On the contrary if the thermosets are burned in inert atmospheres a lot of residual char formation will occur due to the inefficient burning. This char residue may end up as metal carbides due to sintering. Both the char and oxide content that effectively turn into metal carbides and metal oxides respectively lead to mechanical property debits especially in certain alloys. It is presently recognized that thermoplastic binders may be more suitable for 3D printing metal parts due, in part, to the absence of covalent crosslinking between thermoplastic polymer strands. The absence of covalent crosslinking between the thermoplastic polymer strands enables clean removal of the thermoplastic binder in inert, vacuum, or air conditions. That is, the thermoplastic binder is removed from the printed metal part in a manner that does not generate char residue and/or metal oxides. As such, a consolidated metal part formed from a binder jet printed green body metal part with thermoplastic binders may have properties that are similar to the properties of the metal used to manufacture the consolidated metal part.

However, while thermoplastic binders are cleanly removed during debinding and sintering processes, it is presently recognized that green body metal parts printed using thermoplastic binders may not have a suitable green strength for handling during post printing processes (in particular during depowdering processes). This is due, in part, to the absence of covalent crosslinking between the polymer strands of the thermoplastic binder. It is presently recognized that by using a linkable thermoplastic binder that enables linking between thermoplastic polymer strands via weak non-covalent forces, the green strength and stability of the green body metal part may be improved compared to a green body metal part printed using non-linkable thermoplastic binders. Additionally, similar to non-linkable thermoplastic binders, the linkable thermoplastic binders may be readily removed during debinding under inert and vacuum conditions. The weak non-covalent forces linking the polymer strands of the linkable thermoplastic polymer can be easily broken under inert and vacuum conditions to unlink the polymer strands and allow removal of the unlinked thermoplastic polymers. Therefore, unlike thermoset binders that are generally removed in the presence of $O_2$, the linkable thermoplastic binders disclosed herein can be mostly removed in the absence of $O_2$. Moreover, in the presence of $O_2$, the linkable thermoplastic binders can be removed at temperatures that do not generate char residue or induce metal oxide formation. Accordingly, decomposition of the linkable thermoplastic binder results in a green body metal part having a green strength comparable to a green body metal part printed using thermoset binders, and without the undesirable char residue associated with removal of the thermoset binders. Disclosed herein are chemical binders (i.e., linkable thermoplastic binders) that may be used for binder jet 3D printing, that yield a suitable green strength for handling of the green body metal part, and that are readily and cleanly removed from the metal part during heat treatment (e.g., debinding and/or sintering).

With the foregoing in mind, FIG. 1 is a block diagram depicting an embodiment of a method 10 for manufacturing an article (e.g., a consolidated metal part) via binder jet 3D printing using a linkable thermoplastic binder. The linkable thermoplastic binder may include or consist of a two-component thermoplastic polymer that, once cured, bonds particles and layers of a metal powder used to print the article. Additionally, at least one component of the two-component thermoplastic polymer includes one or more functional groups that enable coupling (e.g., linking) of polymer strands within the linkable thermoplastic binder via weak non-covalent forces (e.g., hydrogen bonding, ionic bonding, Van der Waals forces). By way of non-limiting example, the one or more functional groups may include a hydroxyl (—OH), carboxylate (—COOH), amine ($NH_3$), thiol (—SH), amide (—$CONR_2$), or any other suitable functional group that enables linking of polymer strands via weak non-covalent forces, and combinations thereof. By linking the polymer strands of the components in the linkable thermoplastic binder via weak non-covalent interactions after binder jetting and curing, the linkable thermoplastic binder provides a desired green strength for the green body metal part. Additionally, the linkable thermoplastic binder may be readily removed from the printed metal part in a manner that produces a consolidated metal part that is substantially free of char residue associated with the decomposition of the chemical binders used to manufacture the printed metal part and suitable for use in machinery. Additionally, the conditions by which the linkable thermoplastic binder undergoes decomposition in inert atmospheres, mitigates formation of metal oxides within the consolidated metal part resulting from a reaction between the metal of the green body metal part and water ($H_2O$) and/or oxygen ($O_2$) during debinding/sintering.

Figure 2:
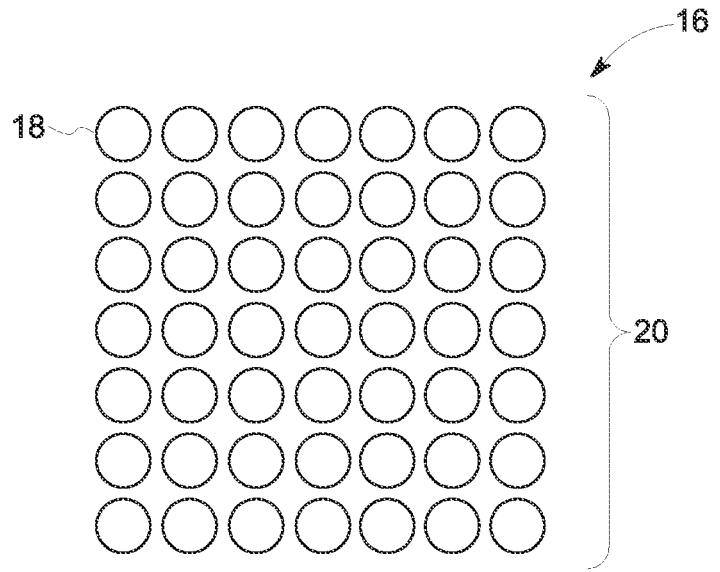
FIG. 2 is a schematic diagram of an embodiment of a layer of material from which the metal part is printed resulting from the acts of the method of FIG. 1.

To facilitate discussion of aspects of the method 10 illustrated in FIG. 1, reference is made to FIGS. 2-5, which generally correspond to certain steps of the illustrated method 10. The method 10 of FIG. 1 begins with depositing a layer of a metal powder that is used to manufacture an article of interest (block 12). For example, FIG. 2 is a cross-sectional view of a layer 16 of a metal powder 18 (e.g., a powder bed) on a working surface of a binder jet printer. In certain embodiments, the layer 16 may have a thickness 20 of between approximately 10 microns (μm) and approximately 200 μm. However, in other embodiments, the thickness 20 of the layer 16 may be any suitable value.

The article to be printed may include a variety of metal parts having complex, 3D shapes, such as, but not limited to, fuel tips, fuel nozzles, shrouds, micro mixers, turbine blades, or any other suitable metal part. Therefore, the metal powder 18 used to print the metal part may vary depending on the type of article and the end use of the article (e.g., gas turbine engines, gasification systems, etc.). By way of non-limiting example, the metal powder 18 may include nickel alloys (e.g., Inconel 625, Inconel 718, Rene'108, Rene'80, Rene'142, Rene'195, and Rene'M2, Marm-247); cobalt alloys (e.g., Hans 188 and L605); cobalt-chromium alloys, cast alloys: (e.g., X40, X45, and FSX414), titanium alloys, aluminum-based materials, tungsten, stainless steel, or any other suitable material and combinations thereof. In certain embodiments, the metal powder 18 may have particles having a particle size distribution (e.g., $d_{50}$) that is between approximately 1 micron (µm) and 75 µm. However, the metal powder 18 may have any other suitable particle size distribution.

Returning to FIG. 1, following deposition of the layer of metal powder 16, the method 10 continues with selectively depositing a linkable thermoplastic binder into portions of the layer 16 according to a pattern (block 24). For example, the linkable thermoplastic binder may be selectively printed into the layer of metal powder 16 using a print head that is operated by a controller based on a CAD design that includes representation of the layer of the article being printed.

Figure 3:
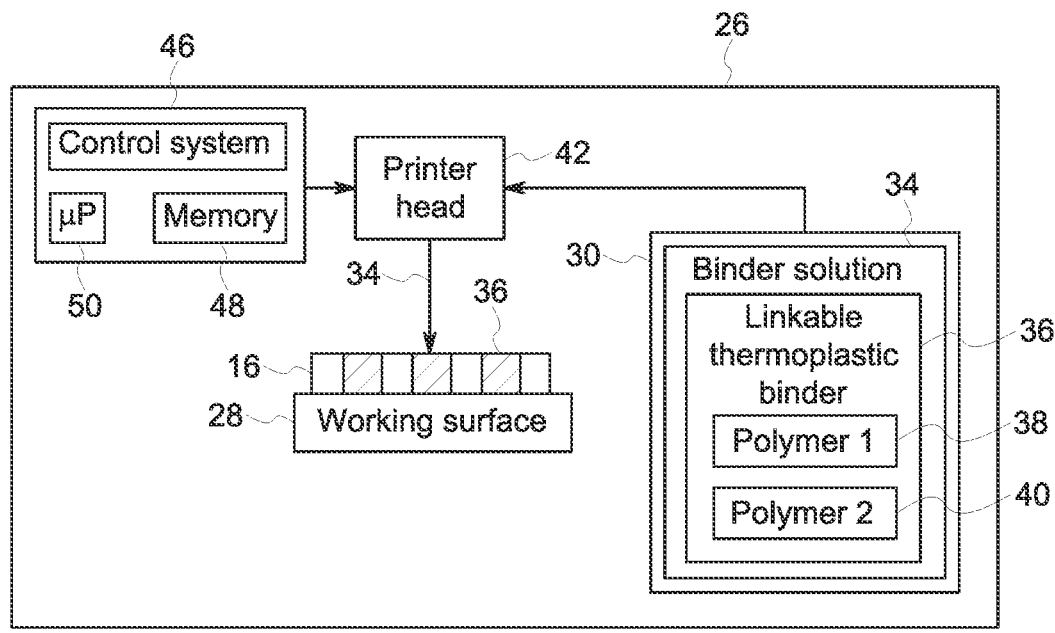
FIG. 3 is a block diagram of an embodiment of a binder jet printer used to print the metal part in accordance with the method of FIG. 1.

For example, FIG. 3 is a block diagram of an embodiment of a binder jet printer 26 that may be used to selectively deposit the linkable thermoplastic binder into the layer 16, according to the acts of block 24 (FIG. 1). In the illustrated embodiment, the binder jet printer 26 includes a working surface 28 that supports the layer of metal powder 16, a reservoir 30 that stores a binder solution 34, and a printer head 42 that is fluidly coupled to the reservoir 30. The binder solution 34 includes a linkable thermoplastic binder 36 that includes a first thermoplastic polymer strand 38 and a second thermoplastic polymer strand 40. The printer head 42 selectively deposits the binder solution 34 into the layer of metal powder 16 to print the linkable thermoplastic binder 36 onto and into the layer 16 in a pattern that is representative of the layer of the metal part being printed. The illustrated binder jet printer 26 includes a control system 46 for controlling operation of the binder jet printer 26. The control system 46 may include a distributed control system (DCS) or any computer-based workstation that is fully or partially automated. For example, the control system 46 can be any suitable device employing a general purpose computer or an application-specific device, which may generally include memory circuitry 48 storing one or more instructions for controlling operation of the binder jet printer 26. The memory 48 may store CAD designs representative of a structure of the article being printed. The processor may include one or more processing devices (e.g., microprocessor 50), and the memory circuitry 48 may include one or more tangible, non-transitory, machine-readable media collectively storing instructions executable by the processor to control actions described herein.

Figure 4:
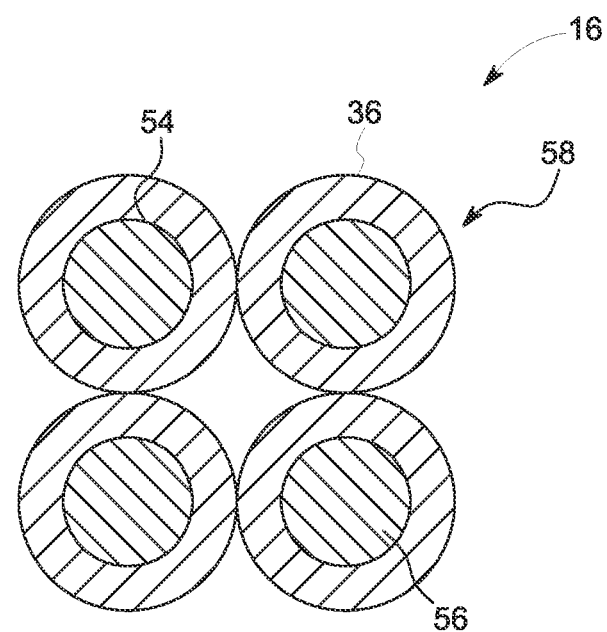
FIG. 4 is a cross-sectional view of an embodiment of a printed layer having particles of the material coated with the linkable thermoplastic binder in accordance with the method of FIG. 1.
Figure 5:
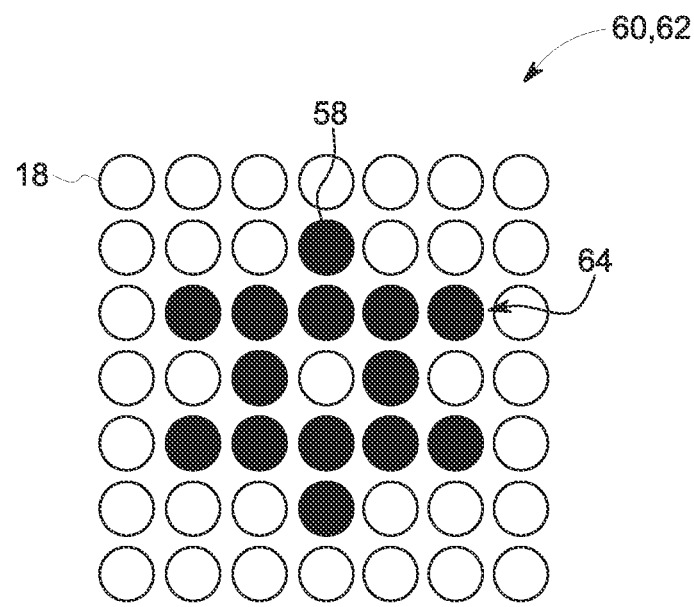
FIG. 5 is a top view of an embodiment of the printed layer of FIG. 4 having the linkable thermoplastic binder selectively deposited in a pattern representative of a structure of the metal part in accordance with the method of FIG. 1.

As discussed above, the binder solution 34 is selectively deposited into the layer of metal powder 16 in a pattern representative of the structure of the metal part being printed. FIG. 4 is a cross-sectional schematic view of the layer of metal powder 16 after deposition of the linkable thermoplastic binder 36. As illustrated, the linkable thermoplastic binder 36 coats an outer surface 54 of metal powder particles 56, thereby generating binder-coated particles 58. The linkable thermoplastic binder 36 bonds the binder-coated particles 58 according to the pattern of binder solution 34 printed into the layer of metal powder 16 to form a layer of the green body metal part after curing (e.g., heat treatment at approximately 200° C.). For example, FIG. 5 is a top view of a printed layer 60 of a green body metal part 62 having the binder-coated particles 58 bonded to one another in a pattern 64 that is representative of the layer of the metal part being printed.

Returning to FIG. 1, the method 10 may repeat the acts of blocks 12 and 24 to continue building up the article in a layer-by-layer manner until a desired number of layers have been printed to generate the green body metal part. The linkable thermoplastic binder 36 bonds each successive layer 60 and provides a certain degree of strength (e.g., green strength) to the printed article such that the integrity of the structure of the printed green body metal part is not affected during post-printing processes (e.g., debinding, sintering, depowdering, etc.). That is, the green strength provided by the linkable thermoplastic binder 36 maintains bonding between the particles of metal powder within the layers 60 and blocks (e.g., resists, prevents) delamination of the layers 60 during handling and post-printing processing of the green body metal part.

The linkable thermoplastic binder 36 disclosed herein facilitates manufacturing of a 3D printed article that is substantially free of char residue that may be formed during debinding and sintering of the 3D printed article. Accordingly, the linkable thermoplastic binder 36 may be selected from a class of thermoplastic polymers that generally decompose into carbon dioxide ($CO_2$) and water ($H_2O$), without requiring the presence of $O_2$, which are cleanly and readily removed during sintering, to generate a consolidated metal part that is substantially free of the linkable thermoplastic binder 36 and decomposition products (e.g., char and metal oxides) that may be generated during heat treatment of the printed metal part. As discussed above, the linkable thermoplastic binder 36 includes the first thermoplastic polymer strand 38 and the second thermoplastic polymer strand 40. The first thermoplastic polymer strand 38 may include functional groups such as hydrogen bond donors, hydrogen bond acceptors, negatively charged groups, positively charged groups, or combinations thereof that complement a functional group of the second thermoplastic polymer strand 40 to facilitate non-covalently linking the polymer strands 38, 40. By way of non-limiting example, the functional groups of the first thermoplastic polymer strand 38 include hydroxyl groups, carboxylate groups, amine, thiol, amide, or any other suitable functional group that enables coupling of polymer strands 38, 40 via weak non-covalent forces, and combinations thereof. The first thermoplastic polymer strand 38 may include polymers such as, but not limited to, polyvinyl alcohol (PVA), polyamides, polyacryl amide, derivatives thereof, or any other suitable thermoplastic polymer that accepts coupling with the second thermoplastic polymer strand 40 via the weak non-covalent forces, and combinations thereof. The first thermoplastic polymer strand 38 may have an average molecular weight of between approximately 5K and 150K. For example, in certain embodiments, the primary thermoplastic polymer 38 may have a molecular weight between approximately 5-10K+/−2K, approximately 10-25K+/−2K, approximately 30-50K+/−2K, approximately 75-100K+/−3K, or approximately 100-150K+/−5K.

Figure 6:
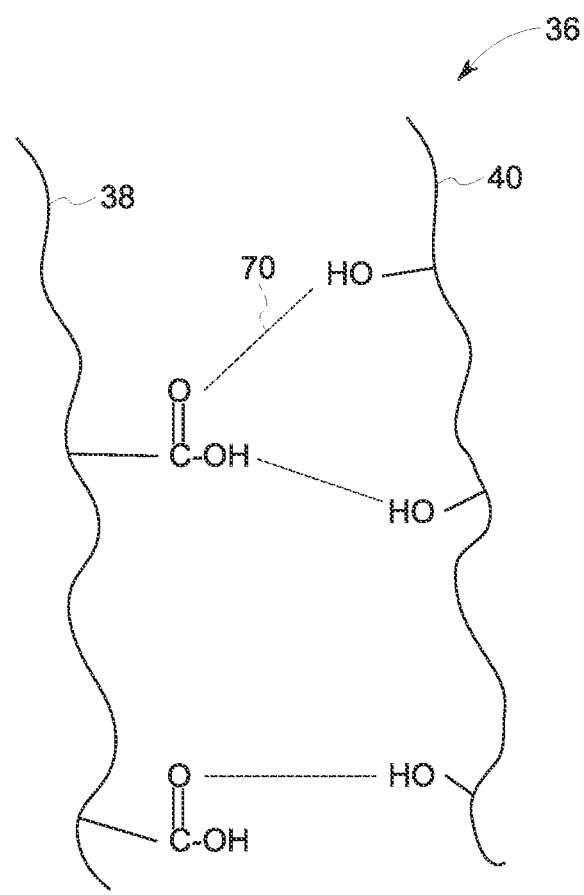
FIG. 6 is a schematic diagram illustrating linking between polymer strands in an embodiment of the linkable thermoplastic binder via non-covalent forces.

As discussed above, the linkable thermoplastic binder improves the green strength to the green body metal part to allow handling and stability of the metal part during post printing processes (e.g., depowdering). Accordingly, the linkable thermoplastic binder includes the second thermoplastic polymer strand 40 to enable coupling (e.g., non-covalent crosslinking) between polymer strands 38, 40 to increase the green strength in the green body metal part. Therefore, the second thermoplastic polymer strand 40 includes functional groups that enable the polymer strands to interact with first thermoplastic polymer strands 38 to link the respective polymer strands via weak non-covalent forces 70, as shown in FIG. 6. For example, the second thermoplastic polymer strand 40 may include functional groups that are complementary to the functional groups on the first thermoplastic polymer strand 38. That is, the second thermoplastic polymer strand 40 may include functional groups that such as hydrogen bond donors, hydrogen bond acceptors, negatively charged groups, positively charged groups, or combinations thereof that complement the functional groups of the first thermoplastic polymer strand 38 to facilitate non-covalently linking the polymer strands 38, 40. By way of non-limiting example, the functional groups of the second thermoplastic polymer strand 40 include hydroxyl groups, carboxylate groups, amine, thiol, amide, or any other suitable functional group that enables coupling of polymers 38, 40 via weak non-covalent forces, and combinations thereof.

In one embodiment, the polymer strands 38, 40 are the same thermoplastic polymer. In this particular embodiment, the first thermoplastic polymer strand 38 is a portion of the thermoplastic polymer that includes the first functional group and the second thermoplastic polymer strand 40 is another portion of the thermoplastic polymer that includes the second functional groups. That is, the first and second polymer strands 38, 40 are portions of a strand of the thermoplastic polymer. Because each polymer strand of the thermoplastic polymer includes both the first and second functional group, homocoupling between the functional group on the first polymer strand 38 portion and the functional group on the second polymer strand 40 portion of may occur. That is, the first functional group in the polymer strand 38, 40 may couple with the corresponding second functional group of the polymer strand 38, 40, thereby decreasing the degree of coupling between separate strands of the thermoplastic polymer. To mitigate homocoupling between the first and second function groups in each respective portion of the polymer strand 38, 40, the binder solution 36 may include primers (e.g., small polymers) that may block coupling between the first and second functional groups of the polymer strand 38, 40. Additionally, a concentration of the polymer strands 38, 40 may be controlled and/or the pH of the binder solution 36 may be adjusted to block homocoupling between the functional groups in the polymer strands 38, 40.

In other embodiments, the first thermoplastic polymer strand 38 is a first thermoplastic polymer and the second thermoplastic polymer strand 40 is a second thermoplastic polymer that is different than the first thermoplastic polymer. Accordingly, homocoupling between the functional groups in the polymer strands 38, 40 is not a concern when the first thermoplastic polymer strand 38 is a first thermoplastic polymer and the second thermoplastic polymer strand 40 is a second thermoplastic polymer that is different from the first thermoplastic polymer. By way of non-limiting example, the second thermoplastic polymer strand 40 may include polyacrylic acid (PAA), polyvinyl pyrrolidone (PVP), polymethyl methacrylate (PMMA), derivatives thereof, or any other suitable polymer having functional groups that enable non-covalent interactions, and combinations thereof. In certain embodiments, the binder solution 34 is substantially free of any surfactants. By omitting the surfactant, the formulation of the binder solution 34 can be simplified and manufacturing costs can be decreased compared to formulations that include the surfactant. Additionally, as discussed in further detail below, binder solution formulations that are substantially free of surfactants may enable printing of green body metal parts having a green strength that is higher than the green strength of green body metal parts printed with binder solution formulations that include a surfactant.

In certain embodiments, the second thermoplastic polymer strand 40 may include a protected polyanhydride. For example, the second thermoplastic polymer strand 40 may include polyvinyl methyl ether-maleic anhydride (PVME-MA). Upon exposure to moisture (e.g., water), the maleic anhydride is hydrolyzed to expose carboxylate functional groups that may interact with the first thermoplastic polymer strand 38 to link the respective polymer strands via the weak non-covalent forces. In certain embodiments, the second polymer strand 40 may include ammonium ($-NH_3^+$) or amine ($-NH_2$). The ammonium links the polymer strands of the respective polymer strands 38, 40 via ionic intramolecular forces. By way of non-limiting example, the second polymer strand 40 may include poly(ethyleneimine), poly (allylamine), polyacrylate copolymer containing 2-(diethylamino)ethyl methacrylate, 2-(dimethylamino)ethyl acrylate, 3-(dimethylamino)propyl acrylate, derivatives thereof, and combinations thereof. The second thermoplastic polymer strand 40 may have an average molecular weight between approximately 1.5K and 160K.

As discussed above, the binder solution 34 includes a mixture of the first thermoplastic polymer strand 38 and the second thermoplastic polymer strand 40. The binder solution 34 may include any suitable ratio of the first thermoplastic polymer strand 38 to the second thermoplastic polymer strand 40. The ratio of the first thermoplastic polymer strand 38 and the second thermoplastic polymer strand 40 in the binder solution 34 is such that a suitable degree of linking between the polymer strands 38, 40 is achieved to yield a green body metal part having a desirable green strength suitable for handling during post printing processes, and that allows clean removal of the linkable thermoplastic binder 36. In addition to the degree of linking between the polymer strands 38, 40, it is also recognized that the combination of the first thermoplastic polymer strand 38 and the second thermoplastic polymer strand 40 can achieve a viscosity that is suitable for 3D binder jet printing (e.g., a viscosity between approximately 2 centipoise (cP) and approximately 200 cP). By way of non-limiting example, the ratio of the first thermoplastic polymer strand 38 to the second thermoplastic polymer strand 40 may be 1:1, 2:1, 3:1, 4:1, 5:1, 6:1, 8:1, 9:1, 10:1, or any other suitable ratio.

As discussed above with reference to FIG. 3, the printer head 42 receives the binder solution 34 (e.g., ink) having the linkable thermoplastic binder 36 and prints the linkable thermoplastic binder 36 into the layer of metal powder 16. Accordingly, the binder solution 34 may have certain properties that facilitate binder jet printing via the printer head 42. The binder solution 34 may include additives that may facilitate deposition of the linkable thermoplastic binder 26 into the layer 16. For example, in certain embodiments, the binder solution 34 may include one or more additives such as surfactants, diluents, viscosity modifiers, dispersants, stabilizers, or any other additive that facilitates jettability of the binder solution 34 and deposition of the linkable thermoplastic binder 36 into the layer 16. The surfactants may be ionic (e.g., zwitterionic, cationic, anionic) or non-ionic depending on the properties of the linkable thermoplastic binder 36 and/or the metal powder 18. By way of non-limiting example, the surfactant may be polypropoxy diethyl methylammonium chloride (e.g., VARIQUAT® CC-42NS), oligomers of hexanoic acid (e.g., HYPERMER® KD1), alkylene oxide copolymer (HYPERMER® KD2), alkylene esters of fatty acids and alkylamines (HYPERMER® KD3), and combinations thereof.

The one or more additives may improve the wettability of the metal powder 18 to facilitate coating the particles of the metal powder 18 with the linkable thermoplastic binder 36. The one or more additives may also change (e.g., modify) the surface tension of the binder solution 34 to facilitate jettability of the binder solution 34. For example, in certain embodiments, the binder solution 34 is generally considered jettable if the Ohnesorge number (e.g., the ratio of viscous forces to inertial and surface tension forces) is between approximately 0.1 and approximately 1.

In certain embodiments, the one or more additives may also include a solvent that dissolves the linkable thermoplastic binder 36. The solvent may be aqueous or non-aqueous, depending on the selected polymer strands 38, 40 and other additives that may be in the binder solution 34. The solvent is generally non-reactive (e.g., inert) such that it does not react with the metal powder 18, the linkable thermoplastic binder 36, or any other additives that may be in the binder solution 34. Additionally, the solvent should readily evaporate after selective deposition of the linkable thermoplastic binder 36 into the layer of metal powder 16 to facilitate bonding of the binder-coated particles 58 and the printed layers 60. Example solvents that may be used in the binder solution include, but are not limited to, water, methylene chloride ($CH_2Cl_2$), chloroform ($CHCl_3$), toluene, xylenes, mesitylene, anisole, 2-methoxy ethanol, butanol, diethylene glycol, tetrahydrofuran (THF), methyl ethyl ketone (MEK), trichloroethylene (TCE), or any other suitable solvent.

The linkable thermoplastic binder 36 in the binder solution 34 may be in the form of pre-formed, dissolved polymer strands 38, 40. The linkable thermoplastic binder 36 may be solubilized in a suitable solvent to facilitate linking of the polymer strands 38, 40, jettability, and deposition into the layer of metal powder 16. Following deposition of the binder solution 34 into the layer of metal powder 16, the solvent may evaporate and the linkable thermoplastic binder 36 may coalesce and bond the binder-coated particles 58 and the printed layers 60 to form the green body metal part.

Following deposition of the layer 16 and printing of the linkable thermoplastic binder 36, as set forth in blocks 12 and 24 of FIG. 1, the method 10 continues with curing the linkable thermoplastic binder to form a layer of the green body metal part (block 74). For example, as discussed above, the binder solution 36 may be a mixture of the linkable thermoplastic binder 36 (e.g., polymer strands 38, 40) and a solvent. While a portion of the solvent in the binder solution 36 may be evaporated during deposition (e.g., printing) of the linkable thermoplastic binder 36, a certain amount of the solvent may remain within the layer of metal powder 16. Therefore, in certain embodiments, the green body metal part may be thermally cured (in a subsequent, post-print step (e.g., block 74 of FIG. 1)) at a temperature that is suitable for evaporating the solvent remaining in the printed layer 60 and allowing efficient bonding of the printed layers 60 of the green body metal part (e.g., approximately 200° C.). Excess material 18 (e.g., the metal powder 18 that is not bonded by the linkable thermoplastic binder 36) may be removed after curing to prepare the green body for debinding and sintering processing. After curing, the green body metal part may undergo a drying step to remove any residual solvent and/or other volatile materials that may remain in the metal part. For example, the green body metal part may be dried in a vacuum, under an inert atmosphere (e.g., nitrogen ($N_2$), argon (Ar)), or air at slightly elevated or room temperatures.

As discussed above, the linkable thermoplastic binder used to form the green body metal part in binder jetting applications may be removed in a manner that mitigates both formation of char residue and metal oxide formation during sintering processes. Accordingly, the method 10 includes removing (e.g., debinding) a portion of the linkable thermoplastic binder 36 from the green body metal part to generate a brown body metal part (block 78). As discussed above, the binders used in binder jetting applications provide strength (e.g., green strength) to the printed article. Therefore, it is desirable to remove only a portion (i.e., not all) of the linkable thermoplastic binder during debinding of the green body metal part to improve the handling strength of the resulting brown body metal part before sintering.

As mentioned above, certain thermoplastic binders used in binder jet 3D printing may not yield a green strength suitable for handling the green body metal part in post printing processes (e.g., depowdering and debinding). However, it is now recognized that by using the linkable thermoplastic binder 36, the green strength of the printed article may be increased compared to an article that is printed using non-linkable thermoset binders. Additionally, the linkable thermoplastic binder 36 can be easily removed in the absence of $O_2$, which may result, in a consolidated article that is substantially free of char residue after debinding and sintering. In this way, certain properties of the consolidated metal part (e.g., level of oxidation) may be similar or identical to the properties of the metal powder 18 used to print the article.

A table of example binder solutions, along with data for the green strength of a green body printed using the binder solutions is shown below, in accordance with embodiments of the present technique. The green body metal part was prepared by placing a metal powder of Rene'108 ($d_{50}$ of approximately 16 μm) in a 1.43" plastic petri dish, and tapping the petri dish approximately 50 times to pack the metal powder. Approximately 2 milliliters (mL) of the binder solution (e.g., polyvinyl alcohol (PVA)), the linkable thermoplastic polymer 36 (e.g., PVA:polyacrylic acid (PAA), PVA:polyvinyl pyrrolidone; PVA:poly(methyl vinyl ether-alt-maleic) anhydride, or a commercial binder) was added dropwise to the metal powder until the metal powder was saturated with the binder solution. The petri dish was tapped simultaneously along with the addition of each drop of the binder solution to allow the binder solution to be absorbed into the packed metal powder. The saturated metal powder was allowed to dry at ambient conditions for approximately 1 hour. Following drying, the saturated metal powder was cured at approximately 85° C. overnight to yield the green body metal part. The green body metal part was subject to 3-point flexural testing with a 500 Newton (N) loaded cell applied until the green body metal part broke. The green strength for each green body metal part prepared according to the above method is reported in Table 1 below.

TABLE 1

GREEN STRENGTH FOR GREEN BODIES PRINTED USING VARIOUS BINDER SOLUTION FORMULATIONS

| BINDER SOLUTION | RATIO | POLYMER MOL. WEIGHT | SURFACTANT | LOAD (NEWTON) | LOAD (POUNDS FORCE (lbf)) |
|---|---|---|---|---|---|
| PVA | — | 13-23K | KD2 | 399 | 89.7 |
| PVA | — | 31-50K | — | 181 | 40.7 |
| PVA | — | 31-50K | KD2 | 224 | 50.4 |
| PVA | — | 31-50K | — | 181 | 40.7 |
| PVA | — | 31-50K | KD2 | 227 | 51.0 |
| PVA | — | 80-125K | — | 183 | 41.1 |
| PVA | — | 80-125K | KD2 | 211 | 47.4 |
| PVA:PAA | 5:1 | 13-23K; 1.8K | — | 523 | 117.5 |
| PVA:PAA | 5:1 | 13-23K; 1.8K | KD2 | 235 | 52.8 |
| PVA:PAA | 5:1 | 31-50K; 1.8K | — | 357 | 80.2 |
| PVA:PAA | 5:1 | 31-50K; 1.8K | KD2 | 336 | 75.5 |
| PVA:PAA | 3:1 | 31-50K; 1.8K | KD2 | 217 | 48.7 |
| PVA:PAA | 2:1 | 31-50K; 1.8K | KD2 | 291 | 65.0 |
| PVA:PAA | 5:1 | 80-125K; 1.8K | KD2 | 186 | 41.8 |
| PVA:PAA | 5:1 | 80-125K; 1.8K | KD2 | 265 | 59.5 |
| PVA:PAA | 2:1 | 80-125K; 1.8K | KD2 | 187 | 42.0 |
| PVA:polyvinyl pyrrolidone | 5:1 | 31-50K; 155K | KD2 | 278 | 62.5 |
| PVA:Poly(methyl vinyl ether-alt-maleic anhydride) | 5:1 | 31-50K; 216K | — | 333 | 74.8 |
| PVA:Poly(methyl vinyl ether-alt-maleic anhydride) | 5:1 | 31-50K; 216K | KD2 | 177 | 39.7 |
| Commercial binder | — | — | — | 283 | 63.6 |

Figure 7:
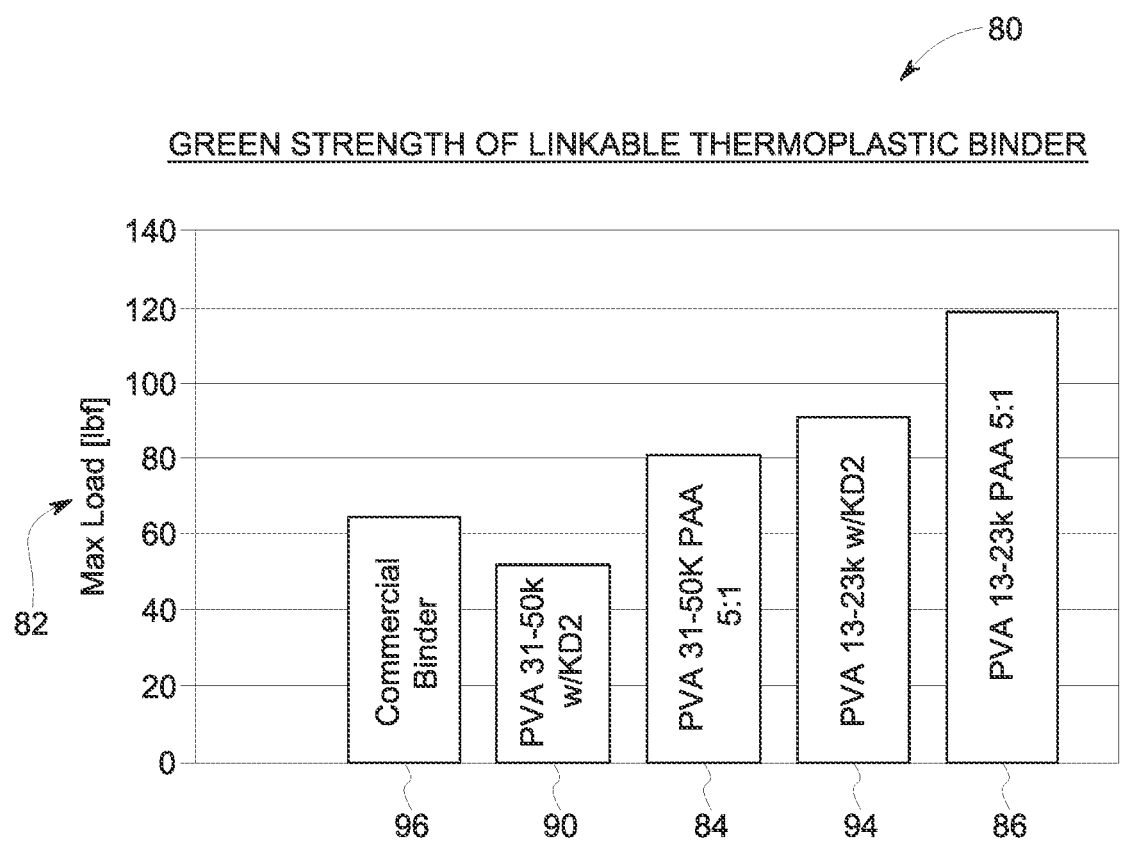
FIG. 7 is a bar graph illustrating a comparison between the green strength of a green body part printed using an embodiment of the linkable thermoplastic binder and the green strength of a green body part printed using a non-linkable binder.

FIG. 7 is a bar graph 80 of green strength associated with embodiments of green body metal parts printed using various binder solution formulations listed in Table 1 above. For example, bar graph 80 illustrates green strength 82 in pounds force (lbF) for green body metal parts 84 and 86 printed with a linkable thermoplastic binder having a 5:1 ratio of either PVA (31-50K):PAA or PVA (13-23K):PAA, respectively. The bar graph 80 also illustrates the green strength for green body metal parts 90 and 94 printed using non-linkable thermoplastic binder formulation having a surfactant and either PVA (31-50K) or PVA (13-23K), respectively, and the green strength for a green body metal part 96 printed using a commercial binder formulation. As shown in FIG. 7, the green strength of green body metal parts 84, 86 have a higher green strength 82 compared to the green body metal part 90, 94, respectively. For example, the green strength for the green body metal parts 84, 86 have between approximately 20% and 35% more than the green strength of the green body metal parts 90, 94 printed with the non-linkable thermoplastic binder formulation. Additionally, certain formulations of the linkable thermoplastic binders disclosed herein demonstrate between 20% and 46% greater green strength compared to existing state of the art binders (e.g., the commercial binder).

Moreover, surprisingly and unexpectedly, it is presently recognized that the linkable thermoplastic binder formulations disclosed herein that do not include a surfactant result in a higher green strength compared to linkable thermoplastic binder formulations that include the surfactant, as shown in Table 1 above. In certain binder formulations, the surfactant may facilitate coating of the metal powder 18 with the binder by enhancing surface properties (e.g., wettability) of the metal powder. However, when using certain linkable thermoplastic binder formulations, the surfactant may hinder molecular interactions between strands of the polymer strands 38, 40, decreasing or blocking coupling between the functional group of the polymer strand 40 with the polymer strand 38 via weak non-covalent forces. As such, the linkable thermoplastic binder 36 may not have sufficient linking between the polymer strands 38, 40 to yield a suitable green strength for handling the printed and cured green body metal part during post printing processes. Therefore, depending on the functional groups of the polymer strand 40 and the type of weak non-covalent forces linking the polymer strands 38, 40, it may be desirable to omit the surfactant from the linkable thermoplastic binder formulation to enable formation of weak non-covalent forces between the polymer strands 38, 40. Alternatively, in certain embodiments, a surfactant that does not substantially interact (e.g., is substantially inert) with the polymer strands 38, 40 may be used in the linkable thermoplastic binder formulation.

During the partial removal of the linkable thermoplastic binder 36 during debinding, the green body metal part may be heated to separate the linked polymer strands 38, 40 and break down a portion of the polymer strands 38, 40. For example, the green body metal part may be heated to a temperature that is approximately 500° C. or less, such as between approximately 250° C. and approximately 450° C., during the debinding step of block 78. The conditions to which the green body metal part is exposed during debinding decomposes the polymer strands 38, 40 and generates the brown body metal part having a substantial portion (e.g., approximately 95%, approximately 96%, approximately 97%, approximately 98%) of the linkable thermoplastic binder 36 removed. The remaining carbon residues of the polymer strand 38, 40 in the brown body metal part after debinding may continue to bond the printed layers in the brown body metal part and provide a brown strength that maintains the structure of the brown body metal part during handling.

In certain embodiments, between approximately 98% and approximately 99.95% of the linkable thermoplastic binder 36 may be removed during debinding by partial decomposition of the linkable thermoplastic binder 36. Many of the small molecules that form during the partial decomposition of the linkable thermoplastic binder may be gaseous at room temperature or at the debinding temperature. The portion of the linkable thermoplastic binder 36 (e.g., oligomers) that remain in the brown body metal part after debinding continue to bond the layers of metal powder of the brown body metal part and enable a suitable amount of brown strength. In one embodiment, the portion of the oligomers that remain in the brown body is between approximately 0.05% and approximately 2%. In other embodiments, the portion of the oligomers that remain in the brown body is between approximately 0.1% and approximately 1%.

In certain embodiments, debinding of the linkable thermoplastic binder 36 may include heating the green body metal part to a desired temperature (e.g., between approximately 250° C. and approximately 450° C.) in an oxygen-free environment (e.g., in a vacuum chamber under inert atmosphere). For example, debinding may be performed under nitrogen ($N_2$), argon (Ar), or another substantially inert gas. However, in certain embodiments, the debinding may be performed in air. Due, in part, to the weak non-covalent forces linking the polymer strands 38, 40 of the linkable thermoplastic binder 36, debinding in air may be done at temperatures less than approximately 450° C., which blocks oxidation of the metal powder 18. As such, the overall properties of the consolidated metal part printed using the linkable thermoplastic binder 36 may be similar to the properties of the metal powder 18 used to manufacture the 3D printed metal part.

Following debinding of the linkable thermoplastic binder 36, as set forth in block 78, the method 10 of FIG. 1 continues with pre-sintering the brown body metal part to remove the remaining portion of the linkable thermoplastic binder (e.g., oligomers formed during debinding) in the brown body metal part (block 100). For example, as discussed above, the linkable thermoplastic binder 36 may partially decompose to form oligomers that provide sufficient strength to the brown body metal part formed from the green body metal part after partially debinding the linkable thermoplastic binder 36, according to the acts of block 78. During pre-sintering, the brown body metal part may be heated to pre-sintering temperatures that are between approximately 500° C. and approximately 800° C. The heat applied to the brown body metal part during pre-sintering decomposes the remaining oligomers into small molecules that quickly volatilize and escape from the brown body metal part. The oligomers decompose cleanly into the smaller molecules, which may evaporate through the porous structure of the brown body, leaving substantially no residue. As such, when the brown body metal part is subsequently sintered, the resulting consolidated metal part may be substantially free of char. Accordingly, the consolidated metal part may have properties similar to those of the metal powder 18 used to print the metal part.

Finally, the method 10 illustrated in FIG. 1 concludes with sintering the brown body metal part to consolidate the particles of metal powder without generating a metal oxides (block 104). During sintering, the brown body metal part may be exposed to a concentrated source of energy (e.g., a laser, electron beam, or any other suitable energy source) that heats the brown body metal part and consolidates the printed layers 60 of the brown body to form a substantially solid metal part (e.g., the consolidated metal part) having a density that is greater than the density of the corresponding brown body metal part. Sintering imparts strength and integrity to the brown body metal part such that the consolidated metal part is suitable for use in machinery. Sintering temperatures may be in excess of 1000° C., depending on the metal powder 18 used to print the part. For example, in certain embodiments, the sintering temperature may be between approximately 1200° C. and approximately 1300° C. Therefore, any organic compounds, such as the binders generally used in binder jetting, that may be present in the brown body metal part may form metal carbides/oxides during sintering.

As discussed above, the char may affect certain characteristics of the consolidated article (e.g., microstructure and/or mechanical properties), which may affect the performance of the consolidated metal part when used in machinery. The production of char during debinding and sintering of the metal part to generate the consolidated article may be mitigated by using thermoplastic polymers, which may be easily removed in inert, vacuum, and air atmospheres. However, thermoplastic binders may not provide sufficient green strength to handle the printed green body in post printing processes (e.g., depowdering). It is now recognized that, by mixing the polymer strand 38 with the polymer strand 40 having functional groups that interact with the polymer strand 38 to generate the linkable thermoplastic binder 36 disclosed herein, the printed green body metal part may have sufficient handling strength for post printing processes, and the consolidated metal part may be substantially free of char residue. Therefore, the properties of the consolidated metal part may be similar to the properties of the metal powder 18, and may be comparable to properties of metal parts manufactured via molding techniques. The consolidated metal part manufactured via binder jet 3D printing using the linkable thermoplastic binder 36 disclosed herein may have a carbon content and an oxygen content that is equal to or less than a carbon content and oxygen content of the metal powder 18 used to print the metal part.

State of the art chemical binders used for 3-D binder jet metal printing generally produce green body metal parts having a green strength that is lower than the green strength of green body metal parts printed the linkable thermoplastic binder disclosed herein. Additionally, state of the art chemical binders used for 3-D binder jet metal printing generally produce consolidated metal articles having char residues that yield carbon (C) and oxygen (O) (e.g., metal oxides or oxygen-containing binder decomposition products) content that is greater than the C and O levels of the metal powder used to print the metal part. However, the linkable thermoplastic binders disclosed herein, improve the green strength of the printed green body that enables handling of the green body metal part during depowdering and debinding processes compared to state of the art chemical binders. Additionally, surprisingly and unexpectedly, certain linkable thermoplastic binder formulations that do not include a surfactant result in an increased green strength compared to linkable thermoplastic binder and non-linkable thermoplastic formulations that include a surfactant.

As discussed above, the linkable thermoplastic binders disclosed herein may be used in binder jetting additive manufacturing to print an article, such as a metal machine part. The disclosed linkable thermoplastic binders may include thermoplastic polymers that interact via weak non-covalent forces to link (e.g., non-covalently cross-link) the respective polymer strands of the thermoplastic polymers in the linkable thermoplastic binder. In this way, the green strength of the printed green body metal part may be increased compared to a green body printed with non-linkable thermoplastic binders. Moreover, the disclosed linkable binders improve the green strength of the green body metal body without the use of surfactants that facilitate interactions between the linkable thermoplastic binder and the particles of metal powder used to print the metal part. Additionally, when heated above a decomposition temperature of the binder, the thermoplastic polymers in the linkable thermoplastic binder form decomposition products (e.g., oligomers) that are relatively stable at a lower debinding temperature, and are readily removed from the metal part at higher (e.g., pre-sintering, sintering) temperatures. The decomposition products may include oligomers that remain in the article after debinding and improve the strength of the brown body metal part. In this way, the integrity of the brown body metal part may be maintained until the article is sintered. Additionally, the oligomers are readily and cleanly decomposed in a pre-sintering step without charring. In this way, the consolidated metal part may be substantially free of char residue, which may deleteriously affect the material properties of the consolidated metal part.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A binder solution configured for use in binder jet printing, comprising:
a binder solution comprising a primer, a surfactant, and a linkable thermoplastic binder comprising a first polymer strand and a second polymer strand, wherein the first polymer strand comprises a first functional group and the second polymer strand comprises a second functional group, and wherein the first and second functional groups are configured to non-covalently couple at least a portion of the second polymer strand with at least a portion of the first polymer strand;
wherein the first polymer strand is a first thermoplastic polymer and the second polymer strand is a second thermoplastic polymer, wherein the first thermoplastic polymer is different from the second thermoplastic polymer, wherein the first polymer strand further comprises the second functional group and the second polymer strand further comprises the first functional group, and wherein the first polymer strand is polyvinyl alcohol (PVA), polyamides, polyacryl amide, or derivatives thereof, or combinations thereof, and wherein the second polymer strand is polyacrylic acid (PAA), polymethyl methacrylate (PMMA), polyvinyl methyl ether-maleic anhydride (PVME-MA), or derivatives thereof, or combinations thereof.

2. The binder solution of claim 1, wherein a molecular weight of the first polymer strand is between 5K and 150K.

3. The binder solution of claim 1, wherein a molecular weight of the second polymer strand is between 1.5K and 160K.

4. The binder solution of claim 1, wherein the first functional group is a hydrogen bonding acceptor or negatively charged, and the second functional group is a hydrogen bonding donor or positively charged, and wherein the linkable thermoplastic binder enables non-covalent crosslinking via non-covalent forces between the first polymer strand and the second polymer strand to increase strength.

5. The binder solution of claim 1, wherein the first and second functional groups comprise a carboxylate group, a hydroxyl group, amide, amine, thiol, or a combination thereof.

6. The binder solution of claim 1, wherein a ratio of the first thermoplastic polymer to the second thermoplastic polymer is 5:1, wherein the primer is configured to block coupling between the first and second functional groups.

7. The binder solution of claim 1, wherein a viscosity of the binder solution is between 2 centipoise and 200 centipoise.

8. A method of binder jet printing a part using the binder jet solution of claim 1, the method comprising:
depositing a layer of a powder on a working surface of a binder jet printer,
selectively printing the binder solution to form a printed layer,
curing the linkable thermoplastic binder in the printed layer to generate a layer of a green body part,
heating the green body part between 250° C and 450° C to remove at least a portion of the linkable thermoplastic binder and generate a brown body part, and
heating the brown body part above 1000° C to sinter the powder to generate the part.

9. The method of binder jet printing the part of claim 8, wherein the binder solution comprises a mixture of the linkable thermoplastic binder and a solvent, and wherein curing the printed layer comprises evaporating the solvent.

10. The method of binder jet printing the part of claim 8, wherein the binder solution comprises a mixture of the linkable thermoplastic binder, a solvent, and the surfactant, and wherein curing the printed layer comprises evaporating the solvent.

11. The method of binder jet printing the part of claim 8, wherein a molecular weight of the first polymer strand is between 5K and 150K, and wherein the molecular weight of the second polymer strand is between 1.5K and 160K.

12. The method of binder jet printing the part of claim 8, wherein heating the green body part between 250° C and 450° C removes between 98% and 99.95% of the linkable thermoplastic binder such that a portion of the linkable thermoplastic binder remains in the brown body part is between 0.05% and 2%.

13. The method of binder jet printing the part of claim 12, further comprising: prior to heating the brown body part above 1000° C, pre-sintering the brown body part to remove the portion of the linkable thermoplastic binder remaining in the brown body part by heating to a pre-sintering temperature between 500° C and 800° C.

14. The method of binder jet printing the part of claim 8, wherein the first functional group is a hydrogen bonding acceptor or negatively charged, and the second functional group is a hydrogen bonding donor or positively charged,.

15. The method of binder jet printing the part of claim 8, and wherein the first and second functional groups comprise a carboxylate group, a hydroxyl group, amine, amide, thiol, or a combination thereof.

16. The method of binder jet printing the part of claim 8, wherein a ratio of the first thermoplastic polymer to the second thermoplastic polymer is 5:1.

* * * * *